Figure 1:
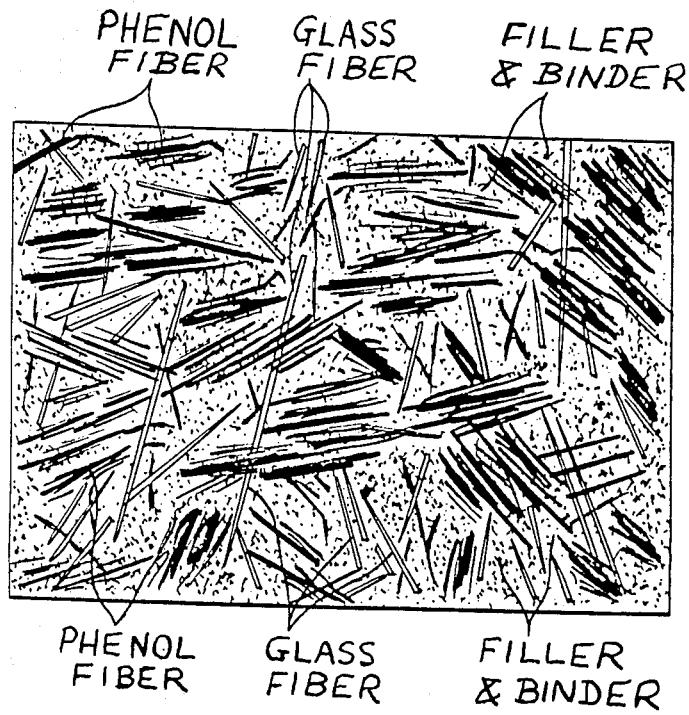

United States Patent [19]

Yamamoto et al.

[11] Patent Number: 4,508,777
[45] Date of Patent: Apr. 2, 1985

[54] COMPRESSED NON-ASBESTOS SHEETS

[75] Inventors: Tsutomu Yamamoto; Masaaki Ashizawa; Kazuo Nishimoto; Yuji Sekiguchi, all of Yokohama

[73] Assignee: Nichias Corporation, Tokyo, Japan

[21] Appl. No.: 454,791

[22] Filed: Dec. 30, 1982

Related U.S. Application Data

[63] Continuation of Ser. No. 243,575, Mar. 13, 1981, abandoned.

[30] Foreign Application Priority Data

Mar. 14, 1980 [JP] Japan ................................. 55-32536

[51] Int. Cl.³ .............................................. D04H 1/08
[52] U.S. Cl. ................................. 428/280; 277/235 B; 428/224; 428/281; 428/283; 428/288; 428/297; 428/408; 428/446
[58] Field of Search ............... 428/224, 280, 281, 288, 428/297, 283, 408, 446; 277/235 B

[56] References Cited

U.S. PATENT DOCUMENTS 4,237,180 12/1980 Jaskovski ........................... 428/299
4,271,228 6/1981 Foster et al. ...................... 428/288

Primary Examiner—James J. Bell
Attorney, Agent, or Firm—Becker & Becker, Inc.

[57] ABSTRACT

A compressed non-asbestos sheet which comprises at least two types of fibers selected from the groups consisting of inorganic fibers other than asbestos and/or organic fibers, natural rubber and/or synthetic rubber, rubber chemicals, and fillers. The group of inorganic fibers is divided into two subgroups, one subgroup consisting of glass fibers, ceramic fibers, etc., and the other subgroup consisting of carbon and metal fibers. The group of organic fibers consists of synthesized and naturally occurring polymeric fibers including polyamide-based fibers, etc. The compressed non-asbestos sheet includes at least one of the combinations of the first and second subgroups, the first subgroup and the group of organic fibers, the second subgroup and the group of organic fibers, the fibers belonging to the second subgroup, and the organic fibers.

13 Claims, 2 Drawing Figures

COMPRESSED NON-ASBESTOS SHEETS

This is a continuation of application Ser. No. 243,575, filed Mar. 13, 1981, now abandoned.

BACKGROUND OF THE INVENTION

The present invention concerns improvements relating to compressed non-asbestos sheets designed for use as gasket materials.

Compressed asbestos sheets are currently available and are used in a wide range of industries, such as shipbuilding, chemical engineering, and in the production of autmobiles and various equipment.

The compressed asbestos sheet is a sheet-like object or article prepared by mixing asbestos fibers, which serve as a base, with rubber, which acts as a binder, and pressing the resultant mixture under pressure into an intimate and uniform cardboard. Depending upon the properties demanded, 60 to 80% of 3 to 7 class asbestos is mixed with natural or synthetic rubber which is dissolved in an organic solvent in quantities of 10 to 20% calculated as solid matter together with other rubber chemicals and fillers. The mixture thus obtained is then laminated on a heated roll.

The asbestos used in the aforesaid sheet is a certain kind of mineral that is increasingly unavailable since its resources are being exhausted, along with the fact that exploitation and transportation costs are increasing. A severe problem also arises in connection with the adverse influence of asbestos on the human body, thus imposing additional restrictions upon the use of asbestos all over the world.

As mentioned above, the compressed asbestos sheet has its major portion composed of asbestos, and involves all the problems stemming from asbestos. For this reason, there is now a strong demand for the development of compressed asbestos-free (non-asbestos) sheets.

A variety of compressed sheets free from asbestos and consisting of other fibers have been proposed for the purpose of providing a solution to the aforesaid problems.

For example, the specification of pre-published Japanese Patent Application No. 86,659/1976 discloses a sheet including as a base inorganic fibers such as glass fibers, ceramic fibers, rock wool, and a heat-resistant inorganic material. This sheet is prepared in the same manner as mentioned in conjunction with the production of the compressed asbestos sheet. However, since this sheet has inferior physical properties, e.g., a tensile strength less than that of the ordinary asbestos sheet by a factor of about $\frac{1}{3}$-$\frac{1}{4}$, it has not been put to practical use as yet.

The specification of pre-published Japanese Patent Application No. 29,658/1976 teaches a gasket material in which a mixture of asbestos and carbon fibers is used as base fibers; and a synthetic rubber latex is used as a binder. The addition of carbon fibers is intended to make an improvement in the heat resistance of the gasket material. However, with the inclusion of asbestos, the problems resulting from its use are also present.

In addition, the specification of pre-published Japanese Patent Application No. 25,824/1975 describes an inorganic fibrous sheeting prepared in a sheet making system, in which non-metallic inorganic fibers and metal fibers are used as a base, and a rubber latex is used as a binder. This sheet material was intended to enhance the heat resistance and sealing properties by mixing the asbestos-containing inorganic fibers with the metal fibers. Since this material is prepared in a sheet making system with the use of a rubber latex binder, however, it does not have the mechanical strength of the compressed asbestos sheet.

The inorganic fibrous sheet, which is prepared in a sheet making system with the use of a rubber latex, as mentioned above, is generally called a beater sheet. The compressed sheet, which is obtained by a laminating method carried out on a heated roll with the use of rubber dissolved in an organic solvent, is identical to the inorganic fibrous sheet in composition. However, they are distinguished from each other by their difference in structure, as will be explained below.

The beater sheet is made by forming the starting material into a sheet while it is in a moist state, and thereafter removing the moisture therefrom by simultaneously heating and vulcanizing. This causes a relatively large number of voids to be left in the sheet after the moisture has been removed.

The compressed sheet is made by pressing and laminating the starting material with the evaporation of a solvent while subjecting it to vulcanization at the same time, thus keeping its void content at an extremely low level. Even though the beater sheet is treated on, e.g., a heated roll, to reduce its void content, it is impossible to attain the low level of voids of the compressed sheet.

In the beater sheet which uses a rubber latex as a binder, the rubber is apt to exist on the surface of the fibers in the form of grains. As a result, the adhesion of the rubber to the fibers is less in comparison to other types of compressed sheets wherein the rubber is dispersed uniformly over the surface of the fibers, such as the type of compressed sheet that makes use of a rubber dissolved in a solvent. Thus, the rubber latex does not act as an efficient binder in the beater sheet.

For the reasons set forth above, the beater sheet is considerably poorer in the physical properties, such as mechanical strength, and sealing properties that are needed for gaskets or similar parts, in comparison to the compressed sheet. Therefore, unlike the compressed sheet, the beater sheet is not suited for the production of parts that are used under stressful conditions.

SUMMARY OF THE INVENTION

It is therefore an object of the present invention to provide a compressed sheet which is free from asbestos fibers, and their accompanying problems, i.e. rising costs, danger to humans, etc. It is a further object to provide a compressed sheet having better physical properties, including mechanical strength and sealing properties, than those of conventional compressed asbestos sheets.

As a result of extensive investigations and studies made to achieve the abovementioned objects, a novel compressed non-asbestos sheet having a mechanical strength higher than that of the compressed asbestos sheet, as well as the compressibility and recovery characteristics needed for gaskets, has now been found.

Figure 2:
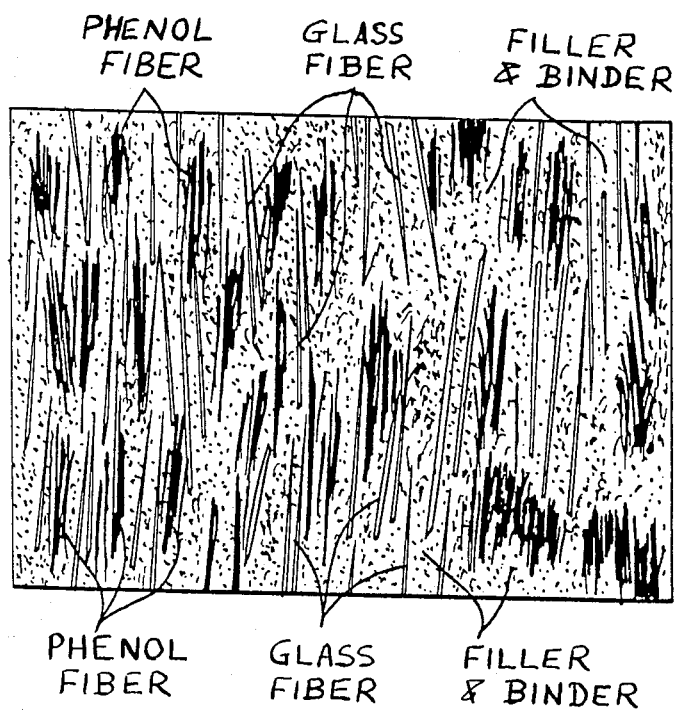

These and other objects and advantages of the present invention will appear more clearly from the following specification in connection with the accompanying drawing, in which:

FIG. 1 is a compressed sheet according to the invention, which is shown in a microphotograph ($\times 70$) showing the internal structure of the sheet product obtained in Example 1; and FIG. 2 is a microphotograph (×70) showing the internal structure of the sheet product obtained in Control 1.

The invention is characterized primarily in that the sheet is obtained by selecting as base fibers at least two types of fibers from various fibers other than asbestos, mixing the base fibers together at an appropriate ratio, preparing a uniform mixture of the mixed fibers with a binder consisting of natural or synthetic rubber dissolved in an organic solvent, rubber chemicals and fillers, and pressing and laminating the obtained mixture on a heated roll. Alternatively, at the last step the mixture may be preformed into a sheeting on a roll, which is in turn placed in a mold and interposed in a heated pressing machine with occasional degasification.

The fibers other than asbestos which are used in the present invention are generally broken down into the following three groups:

First Group of Inorganic Fibers:

Glass, ceramic, boron, molten quartz (prepared from quartz by blowing), silica, molten alumina silicate, alumina, stabilized zirconia, boron nitride, silicon nitride and alkali titanate fibers, rock wool, slag wool, whiskers, wollastonite, and the like Second Group of Inorganic Fibers:

carbon and metal fibers

Third Group of Organic Fibers:

synthesized and naturally occurring polymeric fibers including polyamide-based fibers; polyester-based fibers; polyacrylonitrile-based fibers; polyvinyl alcohol-based fibers; polyolefinic fibers; polyvinyl chloride-based fibers; polyvinylidene chloride-based fibers; polyurethane-based fibers; polyfluorocarbon-based fibers; phenol fibers; heat-resistant fibers such as polybenzimidazole, polyphenylenetriazole, polyphenylene sulfide, polyoxadiazole, polyimide and ladder polymer; proteinous fibers such as animal fibers, silk fibers and artificial protein fibers; cellulosic fibers such as cellulose fibers and fibers derived from cellulose; alginic acid fibers; rubber fibers; and mannan fibers.

In the present invention, at least two types of fibers selected from those other than asbestos are mixed with each other in an appropriate ratio for use. It has now been found that the resulting mixture gives the end sheet product a strength higher than the use of one type of fiber does. The at least two types of fibers used in the present invention are selected from those provided in the three aforementioned groups in one of the following combinations: the inorganic fibers belonging to the first and second groups, the fibers belonging to the first and third groups, the fibers belonging to the second and third groups, the inorganic fibers belonging to the second group alone, and the organic fibers belonging to the third group alone.

The reason why a combination of the inorganic fibers belonging only to the first group is omitted from the purview of the present invention is that they are relatively rigid and exhibit an unsatisfactory interlocking action to each other so that difficulties are encountered during mixing, and that they are easy to break as such. Evidently, a sheet product formed of such fibers alone is inferior in strength to that of a similar product of the fibers belonging to the groups defined in the present invention.

As mentioned above, the compressed sheet described in the prepublished application No. 86,659/1976 is of poor strength. A possible reason for this is that it is composed only of the inorganic fibers belonging to the first group.

In the present invention, the diameter of a single fiber is preferably as small as possible, but is usually on the order of 0.01 to 200 microns. The fibers having a larger diameter are undesirable since difficulties are encountered in the interlocking thereof due to their increased rigidity, thus resulting in a lowering of the strength of the end product. For glass, carbon, metal or phenol fibers and other similar fibers, use is preferably made of commercially available fibers having a diameter of about 5 to 50 microns.

The length of a single fiber is on the order of 0.01 to 50 mm, but is preferably 1 to 10 mm. Fibers having a shorter length than this have a tendency to decrease the strength of the final product since they interlock only to a slight degree. There is also a tendency toward a lowering of the strength and sealing properties of the product when fibers of a longer length are used. This is because the fibers form with rubber, rubber chemicals and the like a mixture in which they are insufficiently dispersed.

The fibers used in the present invention are preferably chosen so that each individual fiber has a diameter and a length falling within the ranges discussed above, although the addition of other fibers is not excluded from the purview of the present invention. Essentially, however, the fibers in the ranges defined above should amount to at least 30%, and preferably 50% or more of the total fiber volume. If, according to the present invention, the fibers used are in a smaller amount, insufficient strength and sealing properties will be given to the final product.

Preferably, the fibers are subjected to surface treatment to enhance the adhesion thereof to the binder rubber. For instance, glass fibers treated with a silane-based coupling agent result in approximately a 120 to 200% increase in tensile strength as compared with untreated fibers.

The optimum mixing ratio of fibers may be varied depending upon the kind, diameter and length thereof. For example, 5 to 100, and particularly 15 to 50, parts by weight of phenol fibers having a mean diameter of 13 microns and a mean length of 3 mm, or carbon fibers having a mean diameter of 10 microns, a mean length of 6 mm, and a carbonization degree of about 80%, should preferably be used per 100 parts of E glass fibers having a mean diameter of 13 microns and a mean length of 3 mm.

Further, 5 to 70, and particularly 13 to 35, parts by weight of kraft pulp having a mean width of 40 microns, a mean thickness of 3 microns, and a mean length of 3 mm should preferably be used per 100 parts by weight of the E glass fibers.

Still further, 5 to 150, and particularly 15 to 100, parts by weight of stainless steel fibers having a mean diameter of 8 microns and a mean length of 5 mm should preferably be applied per 100 parts by weight of the E glass fibers.

In a mixing ratio departing from the foregoing range, there is a tendency toward a lowering of the tensile strength and sealing properties of the final product.

Generally, the fibers having a greater density, such as metal fibers, are preferably used in a greater mixing ratio, whereas the fibers having a greater bulkiness are preferably used in a smaller mixing ratio, if the ratio is given in parts by weight. Favorable results are also obtained if use is made of a mixture of fibers having a varied length rather than a mixture of fibers having a substantially equal length.

The optimum total amount of fibers incorporated in the composition according to the present invention may vary depending upon the type of fibers and rubber used. The fibers are preferably 20 to 800 parts by weight per 100 parts by weight of the rubber.

For instance, per 100 parts by weight of natural or isoprene rubber, it is preferable to use 150 to 500 parts by weight of a mixture of the foregoing E glass fibers with the foregoing phenol fibers in a weight ratio of 4:1.

Further, per 100 parts by weight of styrenebutadiene rubber (SBR) or nitrile rubber (NBR), it is preferable to use 100 to 350 parts by weight of a mixture of the foregoing E glass fibers with the foregoing pulp or stainless steel fibers in a weight ratio of 6:1 or 4:1.

When the amount of fibers departs from the range as defined above, there occurs a lowering of the tensile strength of the end product. Additionally, when the amount of fibers used exceeds the above range, there is a drop of the sealing properties.

The optimum amount of rubber used may preferably be selected between 5% to 50% by weight, depending somewhat upon the type of the rubber, as well as the type and dimensions of the fibers. Among the types of synthetic rubber from which this may be arbitrarily selected are the following: isoprene rubber (IR), styrene-butadiene rubber (SBR), butadiene rubber (BR), nitrile rubber (NBR), chloroprene rubber (CR), butyl rubber (IIR), acryl rubber (AR), urethane rubber (UR), silicone rubber (Si), fluorine rubber (FR), polysulfide rubber (TR), ethylene-propylene rubber (EPR), chlorosulfonated polyethylene (CSM), ethylenevinyl acetate rubber (EUA), chlorinated polyethylene (CPE), alfine rubber (AL), polyester rubber (ESR), epichlorohydrin rubber (ECO), chlorinated butyl rubber (CIR), and nitrile-isoprene rubber (NIR).

For example, a mixture of the foregoing E glass and phenol fibers in a weight ratio of 4:1 should preferably be incorporated with natural rubber (NR) in an amount of 10 to 30% by weight. This weight percentage holds also for the case where a mixture of the foregoing E glass and carbon fibers in a weight ratio of 4:1 is mixed with isoprene rubber (IR).

Further, 15 to 35% by weight of styrene-butadiene rubber (SBR) or nitrile rubber (NBR) should preferably be added to a mixture obtained by mixing the E glass fibers with the pulp in a weight ratio of 6:1 or by mixing the E glass fibers with the stainless steel fibers in a weight ratio of 4:1.

In accordance with the present invention, the compressed non-asbestos sheet is prepared by permitting uniform mixing of at least two types of fibers as specified above, rubber chemicals, fibers, and the like with natural or synthetic rubber that has already been dissolved in an organic solvent. Mixing may be carried out with currently available mixers such as ribbon mixers, Henschel mixers, kneaders, planetary mixers, etc.

Like asbestos, the fibers having a relatively high strength and a certain degree of softness can be formed into a desired product only by thorough mixing. However, such fibers as are used in the present invention generally have an insufficient degree of strength and flexibility. Among others, the inorganic fibers belonging to the first group are so rigid and breakable that the process of mixing reduces them to fine grains, thus resulting in a lowering of the tensile strength required for the end product. Insufficient mixing makes a mixture of the fibers with other materials so nonuniform that incomplete dispersion of the fibers occurs, thus leading to a lowering of the strength and sealing properties of the end product. To handle such fibers, therefore, it is necessary to determine the proper mixing conditions depending upon the capacity of a mixer used. In this case, mixing has to be stopped after a uniform mixture is formed but before polymerization of the fibers takes place.

When mixing is carried out with only the inorganic fibers belonging to the first group, it is very difficult to keep the resultant mixture uniform but unpulverized. Probably, this is one reason why the product composed mainly of the inorganic fibers belonging to the first group exhibits insufficient strength (see the pre-published patent specification No. 86,659/1976).

With the fibers selected from the combinations of the three fiber groups according to the present invention, it is easy to determine the mixing conditions under which the fibers form a uniform mixture with other materials without being reduced to fine grains. For example, a satisfactory mixture is usually obtained with a kneader for 60 to 90 minutes at 45 rpm.

The thus obtained mixture is admitted between a pair of rolls supported at a given interval, and wound around one roll to form a sheeting of uniform thickness. Subsequent winding of the sheeting off the roll provides a preformed sheet.

When the pair of rolls used are surfaced with the same material, the mixture is wound around both rolls. In this way, it is extremely difficult to wind the mixture around the rolls on either one side. As a consequence of intensive investigations, however, it has now been found that the mixture can be wound around the roll on either one side by surfacing the rolls with suitable but different materials.

For example, when a hard chromium-plated roll is used in combination with an acryl rubber-coated roll, the mixture is guided around the former roll. In a combination of a hard chromium-plated roll with a fluorine resin-coated roll, it is wound around the former roll. In a combination of a hard chromium-plated roll with an aluminum roll, winding takes place on the latter roll. In the present invention, preforming may be carried out with any one of these combinations.

Such a preformed sheet, which still contains an amount of solvent and is relatively weak, is easily broken into pieces upon being subjected to an external mechanical stress. Consequently, it is preferable that the peripheral speed of the pair of rolls be kept constant.

The rolls are preferably spaced from each other at an interval of 0.1 to 10 mm, and particularly 0.3 to 5 mm, taking into consideration various factors such as the diameter and peripheral speed of the rolls, the state of the mixture, and the thickness of the end product.

In the process of forming, a mixture of flexible or shorter fibers makes smooth inloads into a relatively narrow roll-nip. However, a mixture of rigid or longer fibers has difficulties in doing so. Even if in the latter case the mixture enters into the nip, the fibers themselves may break under a shearing force. Consequently, it is necessary to use a relatively large roll-nip.

The higher the tackiness and viscosity of a rubber liquid, in which rubber is swelled with a solvent, the greater the strength of the preformed sheet will be. It is therefore preferable that the rubber liquid be adjusted to a higher tackiness in such a range that does not give rise to any difficulties in mixing.

The preformed sheet is interposed in a pressing machine heated to the vulcanization temperature of rubber (60°–200° C.), and is maintained at a lower pressure less than 40 Kgf/cm², while being degasified occasionally in order to thereby completely evaporate the solvent. Thereafter, the sheet is pressed at a higher surface pressure, i.e. 40 to 200 Kgf/cm², into a desired shape.

Depending upon the thickness demanded for the end product, two or more of the preformed sheets may be laminated one upon the other. In this connection, attention should be directed to the fact that the preformed sheet itself has a certain degree of orientation. Consequently, it is also possible to obtain an article which, unlike the prior art asbestos joint sheet, shows isotropy in a plane direction by laminating two or more of such preformed sheets with their orientating directions being alternated at right angles.

When a higher surface pressure is loaded upon the solvent-containing sheet, as mentioned above, from the outset, insufficient pressing of the sheet occurs due to its flow. This is because a lower surface pressure is applied on the sheet at the outset. If, upon removal of the solvent, the sheet is brought under a higher surface pressure, the amount of the sheet flow can be reduced to the lowest level with the result that a sufficiently pressed, intimate sheet is formed.

The reason for preparing a preformed sheet prior to pressing is that direct pressing of the materials which have merely been mixed together does not permit the fibers to interlock on the interfaces of the materials, thus resulting in insufficient bonding being made between said interfaces and deterioration in the mechanical strength of the resulting sheet. By carrying out preforming on rolls as contemplated in the present invention, however, the materials are rolled uniformly so that good bonding is made therebetween, thus providing a sheet having a relatively great strength. In particular, it is possible to attain a more uniform laminate sheet with little variation in physical properties by laminating two or more sheets.

In addition to the aforesaid forming process involving the steps of preforming the starting materials on a pair of rolls followed by heat-pressing, the sheet composition according to the present invention may also be formed by a laminating process effected on heated rolls as carried out with the conventional compressed asbestos sheet. In particular, use of rigid fibers provides only a product having a lower density. It is then preferred to provide further pressing thereof under heated conditions in the process of forming.

The present invention will now be explained with reference to the following examples and controls.

EXAMPLE 1

| Components | % by weight |
| --- | --- |
| E glass chopped strands (diameter: 13 microns, length: 3 mm) | 40 |
| Chopped phenol fibers (diameter: 13 microns, length: 6 mm) | 10 |
| Natural rubber | 15 |
| Sulfur | 1 |
| Zinc flower (zinc oxide) | 1 |
| Vulcanization promotor | 0.2 |
| Fillers | 32.8 |
| Toluene: 0.7 liters per 1 kg of the aforesaid mixture | |

The rubber had been swelled in advance with the solvent. The starting materials as specified above were charged into a kneader and mixed together for about 90 minutes to obtain a mixture. The mixture was put between two pairs of rolls preset at a roll-nip of about 0.4 mm. The two pairs of rolls were plated on one side with hard chromium and coated on the other side with a fluorinated ethylene-propylene copolymer. The mixture was wound around the chromium-plated rolls in a manner as mentioned above.

After the mixture had generally been wound around the rolls to a uniform thickness, the thus preformed sheet, having a thickness of about 0.6 mm, was removed from the rolls by means of a doctor blade. Six preformed sheets were superimposed one upon another with the fibers being orientated in the same direction, and were set in a mold. These sheets were then interposed in a pressing machine preset at about 130° C. and maintained at a surface pressure of 20 Kgf/cm² while being degasified occasionally by opening the machine. Upon the completion of evaporation of the solvent, the sheets were brought under a surface pressure of 90 Kgf/cm² and maintained at that pressure for about 30 minutes. Upon removal, the thus treated sample provided a sheet of about 2 mm in thickness.

EXAMPLE 2

| Componenets | % by weight |
| --- | --- |
| E glass chopped strands (diameter: 13 microns, length: 3 mm) | 40 |
| Chopped carbon fibers (diameter: 10 microns, length: 6 mm, carbonization degree: 80%) | 15 |
| Natural rubber | 15 |
| Sulfur | 1 |
| Zinc flower | 1 |
| Vulcanization promotor | 0.2 |
| Fillers | 27.8 |
| Toluene: 0.7 liters per 1 kg of the aforesaid mixture. | |

In the same manner as in Example 1, the aforesaid components were formed into a sheet.

EXAMPLE 3

| Components | % by weight |
| --- | --- |
| Chopped carbon fibers (diameter: 10 microns, length: 6 mm, carbonization degree: 80%) | 15 |
| Chopped phenol fibers (diameter: 13 microns, length: 6 mm) | 20 |
| Natural rubber | 15 |
| Sulfur | 1 |
| Zinc flower | 1 |
| Vulcanization promotor | 0.2 |
| Fillers | 47.8 |
| Toluene: 0.7 liters per 1 kg of the aforesaid mixture. | |

The procedures of Example 1 were repeated to obtain a sheet of the abovementioned components.

EXAMPLE 4

| Components | % by weight |
| --- | --- |
| Glass chopped strands (diameter: 13 microns, length: 3 mm) | 40 |
| Chopped stainless fibers (diameter: 8 microns, length: 5 mm) | 10 |
| Chopped phenol fibers (diameter: 13 microns, length: 6 mm) | 2.8 |
| Synthetic rubber (NBR) | 15 |
| Sulfur | 1 |

-continued

| Components | % by weight |
| --- | --- |
| Zinc flower | 1 |
| Vulcanization promotor | 0.2 |
| Fillers | 30 |
| Toluene: 0.7 liters per 1 kg of the aforesaid mixture. | |

In the same manner as Example 1, the abovementioned components were formed into a sheet.

EXAMPLE 5

| Components | % by weight |
| --- | --- |
| Glass chopped strands (diameter: 13 microns, length: 3 mm) | 60 |
| Chopped phenol fibers (diameter: 13 microns, length: 6 mm) | 15 |
| Synthetic rubber (SBR) | 20 |
| Sulfur | 1.4 |
| Zinc flower | 1.3 |
| Vulcanization promotor | 0.3 |
| Fillers | 2 |
| Toluene: 0.7 liters per 1 kg of the aforesaid mixture. | |

According to the forming process of the asbestos joint sheet, a mixture of the aforesaid components was laminated on a heated roll to obtain a sheet which was, in turn pressed along with the application of heat.

EXAMPLE 6

| Components | % by weight |
| --- | --- |
| E glass chopped strands (diameter: 13 microns, length: 3 mm) | 33 |
| Chopped phenol fibers (diameter: 13 microns, length: 3 mm) | 8 |
| Synthetic rubber (NBR) | 27 |
| Sulfur | 2 |
| Zinc flower | 2 |
| Vulcanization promotor | 0.4 |
| Fillers | 27.6 |
| Toluene: 0.7 liters per 1 kg of the aforesaid mixture. | |

In a manner similar to that of Example 1, the aforesaid components were mixed and preformed to obtain a preformed sheet of about 1.5 mm in thickness, with a roll-nip of 1.2 mm. A couple of such preformed sheets were placed one upon the other with the fibers being arranged in the opposite orientating directions. Thereafter, the sheets were interposed in a pressing machine preset at about 130° C. and were degasified occasionally by opening the machine, while a surface pressure of 1 Kgf/cm² was maintained in order to permit sufficient evaporation of the solvent. The sheets were then brought under a surface pressure of 80 Kgf/cm² and maintained at that pressure for about 30 minutes. Upon removal, the thus treated sample provided a sheet having a thickness of about 1.5 mm.

EXAMPLE 7

| Components | % by weight |
| --- | --- |
| E glass chopped strands (diameter: 13 microns, length: 3 mm) | 39 |
| Chopped phenol fibers (diameter: 13 microns, length: 3 mm) | 10 |
| Synthetic rubber (SBR) | 24 |
| Sulfur | 1.7 |
| Zinc flower | 1.7 |
| Vulcanization promotor | 0.4 |

-continued

| Components | % by weight |
| --- | --- |
| Fillers | 23.2 |
| Toluene: 1.4 liters per 1 kg of the aforesaid mixture. | |

The procedures of Example 6 were repeated to form a sheet of the abovementioned components.

EXAMPLE 8

| Components | % by weight |
| --- | --- |
| E glass chopped strands (diameter: 13 microns, length: 3 mm) | 47 |
| Chopped carbon fibers (diameter: 10 microns, Length: 6 mm, carbonization degree: 80%) | 12 |
| Synthetic rubber (IR) | 19 |
| Sulfur | 1.4 |
| Zinc flower | 1.4 |
| Vulcanization promotor | 0.3 |
| Fillers | 18.9 |
| Toluene: 0.9 liters per 1 kg of the aforesaid mixture. | |

The procedures of Example 6 were repeated to form a sheet of the abovementioned components.

EXAMPLE 9

| Components | % by weight |
| --- | --- |
| E glass chopped strands (diameter: 13 microns, length: 3 mm) | 47 |
| Chopped stainless fibers (diameter: 8 microns, length: 5 mm) | 12 |
| Natural rubber (NR) | 19 |
| Sulfur | 1.4 |
| Zinc flower | 1.4 |
| Vulcanization promotor | 0.3 |
| Fillers | 18.9 |
| Toluene: 0.9 liters per 1 kg of the aforesaid mixture. | |

The procedures of Example 6 were repeated to form a sheet of the abovementioned components.

EXAMPLE 10

| Components | % by weight |
| --- | --- |
| E glass chopped strands (diameter: 13 microns, length: 3 mm) | 41 |
| Kraft pulp (average width: 40 microns, average thickness: 3 microns, average length: 3 mm) | 7 |
| Synthetic rubber (SBR) | 24 |
| Sulfur | 0.7 |
| Zinc flower | 3.5 |
| vulcanization promotor | 0.5 |
| Fillers | 23.3 |
| Toluene: 1.1 liters per 1 kg of the aforesaid mixture. | |

In a manner similar to that of Example 6, the abovementioned components were formed into a sheet. However, the pulp used had previously been opened by means of a disintegrator in a mechanical manner.

EXAMPLE 11

| Components | % by weight |
| --- | --- |
| Kraft pulp (average width: 40 microns, average thickness: 3 microns, average length: 3 mm) | 20 |
| Chopped phenol fibers | 5 |

-continued

| Components | % by weight |
| --- | --- |
| (diameter: 13 microns, length: 3 mm) | |
| Natural rubber (NR) | 20 |
| Sulfur | 1.5 |
| Zinc flower | 1.5 |
| Vulcanization promotor | 0.3 |
| Fillers | 51.7 |
| Toluene: 0.9 liters per 1 kg of the aforesaid mixture. | |

The abovementioned components were laminated on a heated roll, as used in Example 5, to obtain a sheet. However, the pulp used had mechanically been opened in advance by means of a disintegrator.

EXAMPLE 12

| Components | % by weight |
| --- | --- |
| E glass chopped strands | 38 |
| (diameter: 13 microns, length: 3 mm) | |
| Chopped carbon fibers | 9 |
| (diameter: 10 microns, length: 6 mm) | |
| carbonization degree: 80%) | |
| Wollastonite (average diameter: | 5 |
| 22 microns, average length: | |
| 600 microns) | |
| Synthetic rubber (CR) | 30 |
| Magnesium oxide | 2 |
| Vulcanization promotor | 1.5 |
| Fillers | 14.5 |
| Toluene: 0.9 liters per 1 kg of the aforesaid mixture. | |

The procedures of Example 6 were repeated to form a sheet of the abovementioned components.

EXAMPLE 13

| Components | % by weight |
| --- | --- |
| E glass chopped strands | 39 |
| (diameter: 13 microns, length: 3 mm) | |
| Chopped acrylonitrile fibers | 10 |
| (diameter: 12 microns, length: 6 mm) | |
| Synthetic rubber (BR) | 24 |
| Sulfur | 0.7 |
| Zinc flower | 2.4 |
| Vulcanization promotor | 0.5 |
| Fillers | 23.4 |
| Toluene: 0.7 liters per 1 kg of the aforesaid mixture. | |

The procedures of Example 6 were repeated to form a sheet of the abovementioned components.

EXAMPLE 14

| Components | % by weight |
| --- | --- |
| Chopped ceramic fibers (average | 32 |
| diameter: 3 microns, length: 5 mm) | |
| Kraft pulp (average width: 40 microns, | 8 |
| average thickness: 3 microns, | |
| average length: 3 mm) | |
| Natural rubber (NR) | 20 |
| Sulfur | 1.4 |
| Zinc flower | 1.4 |
| Vulcanization promotor | 0.3 |
| Fillers | 36.9 |
| Toluene: 0.9 liters per 1 kg of the aforesaid mixture. | |

In a manner similar to that of Example 6, the abovementioned components were formed into a sheet. However, the pulp used had mechanically been opened in advance by means of a disintegrator.

EXAMPLE 15

| Components | % by weight |
| --- | --- |
| E glass chopped strands | 30 |
| (diameter: 13 microns, length: 3 mm) | |
| Rock wool (average diameter: | 10 |
| 5 microns, average length: 3 mm) | |
| Kraft pulp (average width: | 4 |
| 40 microns, average thickness: 3 | |
| microns, average length: 3 mm) | |
| Chopped polyester fibers | 4 |
| (diameter: 12 microns, length: 2 mm) | |
| Potassium titanate fibers (average | 4 |
| diameter: 0.2 microns, average | |
| length: 25 microns) | |
| Natural rubber (NR) | 20 |
| Sulfur | 1.4 |
| Zinc flower | 1.4 |
| Vulcanization promotor | 0.3 |
| Fillers | 24.9 |
| Toluene: 0.9 liters per 1 kg of the aforesaid mixture. | |

The procedures of Example 6 were repeated to form a sheet of the abovementioned components. However, the pulp used had mechanically been opened in advance by means of a disintegrator.

CONTROL 1

| Components | % by weight |
| --- | --- |
| E glass chopped strands | 50 |
| (diameter: 13 microns, length: 3 mm) | |
| Natural rubber (NR) | 15 |
| Sulfur | 1 |
| Zinc flower | 1 |
| Vulcanization promotor | 0.2 |
| Fillers | 32.8 |
| Toluene: 0.7 liters per 1 kg of the aforesaid mixture. | |

A mixture of the abovementioned components was formed into a sheet in a manner similar to that of Example 1.

CONTROL 2

| Components | % by weight |
| --- | --- |
| Chopped phenol fibers | 25 |
| (diameter: 13 microns, length: 6 mm) | |
| Natural rubber | 15 |
| Sulfur | 1 |
| zinc flower | 1 |
| Vulcanization promotor | 0.2 |
| Fillers | 57.8 |
| Toluene: 0.7 liters per 1 kg of the aforesaid mixture. | |

A mixture of the abovementioned components was formed into a sheet according to the procedures of Example 1.

Control 3

| Components | % by weight |
| --- | --- |
| Chopped carbon fibers | 30 |
| (diameter: 10 microns, length: 6 mm, | |
| carbonization degree: 80%) | |
| Natural rubber | 15 |
| Sulfur | 1 |
| Zinc flower | 1 |
| Vulcanization promotor | 0.2 |
| Fillers | 52.8 |

| Components | % by weight |
|---|---|
| Toluene: 0.7 liter per 1 kg of the aforesaid mixture. | |

A mixture of the abovementioned components was formed into a sheet according to the procedures of Example 1.

CONTROL 4

| Components | % by weight |
|---|---|
| Kraft pulp (average width: 40 microns, average thickness: 3 microns, average length: 3 mm) | 20 |
| Sulfur | 1 |
| Natural Rubber (NR) | 15 |
| Zinc flower | 1 |
| Vuncanization promotor | 0.2 |
| Fillers | 62.8 |
| Toluene: 0.7 liters per 1 kg of the aforesaid mixture. | |

A mixture of the abovementioned components was formed into a sheet according to the procedures of Example 1. However, the pulp used had mechanically been opened in advance with a disintegrator.

CONTROL 5

| Components | % by weight |
|---|---|
| Potassium titanate fibers (average diameter: 0.2 microns, length: 25 microns) | 70 |
| Natural rubber (NR) | 15 |
| Sulfur | 1 |
| Zinc flower | 1 |
| Vulcanization promotor | 0.2 |
| Fillers | 12.8 |
| Toluene: 0.7 liters per 1 kg of the aforesaid mixture. | |

A mixture of the abovementioned components was formed into a sheet according to the procedures of Example 1

CONTROL 6

| Components | % by weight |
|---|---|
| Wollastonite (average diameter: 22 microns, length: 600 microns) | 80 |

| Components | % by weight |
|---|---|
| Natural rubber (NR) | 10 |
| Sulfur | 0.7 |
| Zinc flower | 0.7 |
| Vulcanization promotor | 0.2 |
| Fillers | 8.4 |
| Toluene 0.5 liters per 1 kg of the aforesaid mixture. | |

A mixture of the abovementioned components was formed into a sheet according to the procedures of Example 1.

It should be noted that, in Controls 2–4, the amounts of the phenol fibers, carbon fibers and pulp used are less than those of other fibers. This is because these fibers are lower in density than inorganic fibers such as glass fibers, so that they are of sufficient bulkiness to render mixing difficult.

It should also be noted that all the chopped strands of glass used in the examples and controls are surfaced with a silane-based coupling agent.

Table 1 shows the values found for the typical physical properties of the products obtained in the examples and controls. The measurements were determined according to JIS R 3453 standards.

The measurements mentioned in Controls 1–6 of Table 1 show that the sheet products prepared by using only the fibers other than asbestos have a considerably lower tensile strength as compared with the ordinary compressed asbestos sheet, which has a tensile strength of between 2 and 4 Kgf/mm$^2$. As will be understood from the results of Examples 1–15, however, it is evident that the sheets obtained from a mixture of at least two types of fibers have a high tensile strength in comparison with that of the asbestos sheet, although they do not afford such a high strength in separate form.

The ordinary compressed asbestos sheet has a compressibility of the order of 7 to 17% and a recovery of about 40 to 60%. As shown in Examples 1–15, however, the sheets according to the present invention are superior in both rates to the compressed asbestos sheet. This offers a great advantage to gasket materials.

In the ordinary compressed asbestos sheet, there is a fear that it may suffer flex cracking. Since the sheet according to the present invention excels in flex cracking resistance, however, it can be folded upon itself with no danger of any cracks.

TABLE I

| Ex. No. | Fibers Used | Rubber Used | Molding Method | Tensile Strength in Kgf/mm$^2$ | Compression in % | Recovery in % |
|---|---|---|---|---|---|---|
| 1 | Glass, Phenol | NR | Heat-pressing | 3.0 | 17 | 73 |
| 2 | Glass, Carbon | NR | " | 2.2 | 26 | 69 |
| 3 | Carbon, Phenol | NR | " | 2.6 | 17 | 75 |
| 4 | Glass, Stainless Steel, Phenol | NBR | " | 2.3 | 20 | 67 |
| 5 | Glass, Phenol | SBR | Heat-pressing and rolling | 2.5 | 20 | 75 |
| 6 | Glass, Phenol | NBR | Heat-pressing | 2.7 | 18 | 69 |
| 7 | Glass, Phenol | SBR | " | 2.7 | 24 | 63 |
| 8 | Glass, Carbon | IR | " | 2.8 | 23 | 69 |
| 9 | Glass, Stainless Steel | NR | " | 2.5 | 26 | 66 |
| 10 | Glass, Pulp | SBR | " | 2.8 | 21 | 69 |
| 11 | Pulp, Phenol | NR | Heat-pressing and rolling | 2.2 | 17 | 55 |
| 12 | Glass, Carbon, Wollastonite | CR | Heat-pressing | 2.0 | 22 | 65 |
| 13 | Glass, Acryl | BR | " | 2.1 | 24 | 68 |
| 14 | Ceramic, Pulp | NR | " | 2.2 | 19 | 65 |

TABLE I-continued

| | Fibers Used | Rubber Used | Molding Method | Tensile Strength in Kgf/mm² | Compression in % | Recovery in % |
|---|---|---|---|---|---|---|
| 15 | Glass, Rock wool, Pulp, Polyester, Potassium titanate | NR | " | 2.5 | 20 | 68 |
| Control No. | | | | | | |
| 1 | Glass | NR | " | 1.2 | 17 | 64 |
| 2 | Phenol | NR | " | 1.2 | 17 | 64 |
| 3 | Carbon | NR | " | 1.2 | 13 | 75 |
| 4 | Pulp | NR | " | 1.0 | 19 | 42 |
| 5 | Potassium titanate | NR | " | 0.4 | 32 | 47 |
| 6 | Wollastonite | NR | " | 0.2 | 30 | 24 |

Chrysotile asbestos, which is used for most of the compressed asbestos sheets, is susceptible to acid attack; hence, the sheet based thereon has a disadvantage in that it is low on acid resistance. In this respect, however, the present invention also offers an advantage since acid resistant fibers, such as phenol fibers, can selectively be used.

Usually, the asbestos that is a naturally occurring mineral contains therein magnetite and free chlorine ($Cl^{-1}$) and, as a matter of course, the compressed sheet composed mainly of the asbestos contains these substances. When such a sheet is applied as a sealing material for a stainless flange, a problem often arises in connection with the fact that pinholes are formed in the material surface as a result of the corrosive action of such substances.

The present invention is also applicable to stainless-made gaskets since the fibers which are free from any corrosive substances can be chosen without restriction.

In what follows, reference will be made to the reasons why the strength of the sheet according to the present invention is improved to the level of the compressed asbestos sheet by mixing at least two types of fibers.

Generally, it appears that the strength of the ordinary short-fiber reinforced composite material is influenced by the following factors:

(1) the aspect ratio of fibers (i.e., length/diameter ratio),
(2) the bonding force of fibers to a matrix surface,
(3) the interlocking force of fibers,
(4) the matrix strength,
(5) The fiber content by volume, and
(6) the fiber strength.

When the compressed sheet ruptures under tension, yielding destruction of the fibers themselves is not dominative due to the fact that they suffer damage on the outside of the matrix. Thus, the sixth factor may be left out of consideration.

In the compressed sheet, the fifth factor is determined by taking into consideration the type of the matrix (rubber) used and the optimum amount of the vulcanizing agent, and the fourth factor depends upon the optimum amount of the fibers applied. Therefore, the optimum values of these factors are readily found by experiment.

To improve the strength of the compressed sheet, therefore, it is required to embody technically elaborative ideas in the remaining factors 1 to 3. A detailed discussion will now be given on these points.

(1) Aspect Ratio of Fibers

Asbestos can be reduced to single fibers having a diameter of 250 to 400 Å upon complete opening, whereas the greater part of inorganic and organic fibers except asbestos are opened only to a diameter of 2 to 5 microns at the currently available technical level. It can therefore be presumed that, in the same length, the asbestos has an aspect ratio larger than those of other inorganic and organic fibers by a factor of 100 to 200. This implies that the asbestos has, at the lowest estimate, an aspect ratio larger than those of other fibers by a factor of tens, even though it is not completely opened. In other words, the fibers converge to some extent. This appears to be responsible for the fact that the compressed non-asbestos sheet is short of strength, unlike the compressed asbestos sheet.

The aspect ratios of other fibers may be brought close to that of asbestos by increasing the length thereof. In a length exceeding the upper limit as defined in the present invention, however, undesirable dispersion of the fibers takes place in mixing, thus resulting in deterioration not only in strength but also in sealing properties. Thus, it is difficult to increase the aspect ratio without limitation due to the restrictions imposed upon the maximum length of the fibers.

Among the aforesaid fibers, there are substances which, like potassium titanate fibers, are formed into fibers by the growth of crystals. Such fibers may be processed to a diameter close to that of asbestos. However, it is impossible to make the aspect ratio sufficiently large by the currently available technique since they have an extremely short length. In other words, they are in a substantially powdery form.

If provision is made of fibers that do not belong to asbestos, but yet are equivalent in length and diameter thereto, then it will be possible to prepare a high-strength compressed sheet therefrom. Under existing circumstances, however, difficulties still arise in making improvements in strength.

A combination of the inorganic fibers that belong to the first group, and that are rigid and easily breakable, has proved to cause the fibers to be pulverized in mixing, thus leading to decreases in aspect ratio. According to the present invention, however, it has been found that the decreases in aspect ratio can be minimized by using these inorganic fibers in combination with the inorganic and organic fibers of the second and third groups. This point is considered essential in connection with the preparation of a high-strength sheet article.

(2) Interfacial Bonding Force between Fibers and Matrix

In general, it is considered that an increase in the interfacial bonding force between the fibers and the matrix gives rise to improvements in strength.

Normally, the interfacial bonding force and compatibility between two substances are evaluated in terms of a solubility parameter (SP value).

The SP value is inherent in various substances, and it is reported that the substances having similar SP values generally show good compatibility with each other.

Referring to the compressed sheet, the rubber used as a matrix has an SP value of the order of 7 to 10, which broadly holds also for other organic substances. The inorganic substances generally have a considerably greater SF value, as will be understood from the fact that the value of glass is between 122 and 133.

It can therefore be presumed that the organic fibers are superior to the inorganic fibers in the interfacial bonding force relative to rubber.

In the use of glass fibers, which show an unsatisfactory compatibility to rubber, the present invention contemplates lowering the surface SP value of the glass, and thereby improving the bonding force thereof to the rubber, by surfacing them with a silane-based coupling agent. The results indicate that about a 120 to 200% increase in tensile strength is attained as compared with untreated glass fibers.

(3) Interlocking Force of Fibers

In general, it is considered that the greater the interlocking force of fibers, the greater the strength will be.

The asbestos fibers have a larger interlocking force due to their flexibility and surface roughness. This probably assures that additional strength is added to the compressed asbestos sheet.

Naturally occurring fibers, inclusive of asbestos, are presumed to possess a greater interlocking force. However, man-made inorganic fibers and organic fibers made of synthesized polymeric materials are relatively difficult to interlock since most of them have a smooth surface. In particular, the man-made inorganic fibers have only a little interlocking force since most of them are rigid enough to prevent substantial interlocking thereof. For this reason, it is impossible to obtain a high-strength compressed sheet only by replacement of such fibers with asbestos.

However, when at least two types of fibers are combined with each other and used in an appropriate mixing ratio as contemplated in the present invention, good dispersion and, hence, interlocking of the fibers takes place, thus providing an increased interlocking force. Such an effect is not attained at all by the use of one type of fiber.

The preferable range of fiber content is 25 to 75 weight percentage, while that of rubber is 50 to 50 weight percentage, and filler is 2 to 52 weight percentage.

When the amount of fiber is less than 25 weight percentage, there is a drop in tensile strength. When the amount of fiber is greater than 75 weight percent, there is a drop in tensile strength with a decrease in sealing effectiveness. When the rubber weight percent is less than 5 percent, there is a reduction in tensile strength with a decrease in sealing effectiveness; and when the weight percent of rubber is greater than 50 percent, there is a decrease in tensile strength. An amount of filler less than 2 percent causes a drop in tensile strength, while an amount of filler greater than 50 percent causes a drop in tensile strength and a decrease in sealing effectiveness. Moreover, the resulting product has a limited elasticity and becomes brittle.

To demonstrate this, microphotographs are attached hereto as FIGS. 1 and 2. FIG. 1 is a microphotograph in which glass fibers appear as colorless, transparent, straight fibers, while the irregularly bent brown fibers are phenol fibers. FIG. 1 shows the internal structures of the sheet product obtained in Example 1, from which it is clear that the fibers are well dispersed, and that the glass and phenol fibers interlock in a satisfactory manner. FIG. 2 is a microphotograph showing the internal structure of the sheet product obtained in Control 1, from which it is observed that the dispersion and interlocking of the fibers are insufficient.

The compressed asbestos-free sheets according to the present invention are useful as gasket materials for which the compressed asbestos sheet has so far been employed, and are applicable to friction materials and electrical insulators as well.

As will be understood from the foregoing, the compressed sheet prepared according to the present invention is composed primarily of the combination of fibers which were found as a consequence of intensive and advanced investigations. This sheet resembles that disclosed in the specification of pre-published application No. 86659/1976, since it is relatively close in structural components, and yet has a much greater strength. In addition, the present sheet is superior in physical properties to the conventional compressed asbestos sheet, and has a marked advantage thereover in that it provides a solution to the environmental pollution that originates from asbestos and gives rise to worldwide discussion. Thus, the compressed asbestos-free sheet according to the present invention lends itself to gasket and many other uses, and thus is of greater value.

In summary, the present invention relates to a material for manufacturing asbestos-free gasket sheets upon subsequent compression and heat-treating of the material, the material including in combination:

a fiber base making up 25% to 75% of the material by weight, the fiber base being uniformly mixed and including at least two types of fibers; wherein one type of fiber is glass fiber treated with a coupling agent and the other type of fiber is selected from the group consisting of carbon fibers, metal fibers and organic fibers, and wherein the individual fibers have an average diameter in the range of 0.01 to 200 microns and an average length in a range of 0.01 to 50 mm;

a rubber binder for the fiber base with such rubber binder making up 5% to 50% of the material by weight;

fillers making up 2% to 52% of the material by weight;

a solvent for dissolving the rubber binder; and rubberizing chemicals including sulfur, a vulcanization promoter and zinc-flower making up 2% to 5% of the material by weight, whereby when the material is subsequently simultaneously heated and compressed, a sheet is produced which is used for forming asbestos-free gaskets.

The two types of fibers have a total of weight which is in the range of 20 to 100 parts by weight per 100 parts by weight of rubber.

The rubber is synthetic rubber.

The glass fibers have been treated with a silene-base coupling agent to improve the bonding force with the rubber and to thereby enhance tensile strength.

The organic fibers are phenol fibers.

The present invention is, of course, in no way restricted to the specific disclosure of the specification and drawing, but also encompasses any modifications within the scope of the appended claims.

What we claim is:

1. A compressed non-asbestos gasket material sheet having an improvement which comprises in combination:

a base including 25 to 75% by weight of at least two types of fibers selected from at least one of two groups of inorganic fibers other than asbestos and a group of organic fibers, the inorganic and organic fibers having a uniform mix completely free of asbestos;

rubber as a binder for said base including 5 to 50% by weight thereof selected from the group consisting of natural rubber and synthetic rubber in a solvent with the uniform mix of inorganic and organic fibers;

the remainder fillers and rubber chemicals in a compressed sheet having void content at an extremely low level that avoids shrinkage upon rubber vulcanization into an intimate and dense mix completely free of asbestos.

2. A compressed non-asbestos gasket material sheet in combination according to claim 1, in which said inorganic group comprises a first subgroup and a second subgroup, said first subgroup consisting of glass, ceramic, boron, molten quartz, silica, alumina silicate, alumina, stabilized zirconia, boron nitride, silicon nitride and alkali titanate fibers, rock wool, slag wool, whisker, and wollastonite, and said second subgroup consisting of carbon and metal fibers; and in which said organic group consists of synthesized and naturally occurring polymeric fibers including polyamide-based fibers; polyester-based fibers; polyacrylonitrile-based fibers; polyvinyl alcohol-based fibers; polyolefinic fibers; polyvinyl chloride-based fibers; polyvinylidene chloride-based fibers; polyurethane-based fibers; polyurea-based fibers; polyfluorocarbon-based fibers; phenol fibers; heat-resistant fibers including polybenzimidazole, polyphenylenetriazole, polyphenylene sulfide, polyoxadiazole, polyimide and ladder polymer; proteinous fibers including animal fibers, silk fibers and artificial protein fibers; cellulosic fibers including cellulose fibers and fibers derived from cellulose; alginic acid fibers; rubber fibers; and mannan fibers.

3. A compressed non-asbestos gasket material sheet in combination according to claim 2, in which said at least two fibers are selected from the group consisting of said second subgroup, said organic group, the combination of said first subgroup and said second subgroup, the combination of said first subgroup and said organic group, and the combination of said second subgroup and said organic group.

4. A compressed non-asbestos gasket material sheet in combination according to claim 1, in which each individual fiber of said at least two types of fibers has an average diameter of 0.01 to 200 microns and an average length of 0.01 to 50 mm, and in which said at least two types of fibers amount to at least 30 percent of the total fiber volume of said sheet.

5. A compressed non-asbestos gasket material sheet in combination according to claim 1, in which said at least two types of fibers have a total weight which is 20 to 800 parts by weight per 100 parts by weight of said rubber.

6. A compressed non-asbestos gasket material sheet in combination according to claim 1, in which said synthetic rubber is arbitrarily selected from the group consisting of isoprene rubber (IR), styrene-butadiene rubber (SBR), butadiene rubber (BR), nitrile rubber (NBR), chloroprene rubber (CR), butyl rubber (IIR), acryl rubber (AR), urethane rubber (UR), silicone rubber (Si), fluorine rubber (FR), polysulfide rubber (TR), ethylene-propylene rubber (EPR), chlorosulfonated polyethylene (CSM), ethylenevinyl acetate rubber (EVA), chlorinated polyethylene (CPE), alfine rubber (AL), polyester rubber (ESR), epichlorohydrin rubber (ECO), chlorinated butyl rubber (CIR) and nitrilisoprene rubber (NIR).

7. A compressed non-asbestos gasket material sheet in combination according to claim 1, in which said fibers are subjected to surface treatment with a silene-based coupling agent to increase tensile strength thereof and to enhance adhesion thereof to the binder rubber.

8. A material for manufacturing asbestos-free gasket sheets upon subsequent compression and heat-treating of the material, the material comprising, in combination:

a fiber base making up 25% to 75% of the material by weight, the fiber base being uniformly mixed and including at least two types of fibers; wherein one type of fiber is glass fiber treated with a coupling agent and the other type of fiber is selected from the group consisting of carbon fibers, metal fibers and organic fibers, and wherein the individual fibers have an average diameter in the range of 0.01 to 200 microns and an average length in the range of 0.01 to 50 mm;

a rubber binder for the fiber base, said rubber binder making up 5% to 50% of the material by weight;

fillers making up 2% to 52% of the material by weight;

a solvent for dissolving the rubber binder, and rubberizing chemicals including sulfur, a vulcanization promotor and zinc-flower, making up 2% to 5% of the material by weight, whereby when the material is subsequently simultaneously heated and compressed, a sheet is produced which is used for forming asbestos-free gaskets.

9. A compressed non-asbestos gasket material sheet comprising at least two types of fibers selected from glass fibers, polyamide base fibers and cellulose base fibers, said fibers containing short fibers, each having an average diameter of 0.01 to 200 microns and an average length of 0.01 to 50 mm, in an amount of 30% or more of the total fiber volume, solid natural or synthetic rubber, rubber chemicals and fillers, wherein the total amount of fiber is 50 to 200 parts by weight per 100 parts by weight of rubber, and the amount of said natural or synthetic rubber to be added is 5 to 20% by weight.

10. The material of claim 8 wherein the rubber is synthetic rubber.

11. The material of claim 8 in which the glass fibers have been treated with a silane-based coupling agent to improve the bonding force with the rubber and to thereby enhance tensile strength.

12. The material of claim 1 wherein the organic fibers are phenol fibers.

13. A compressed non-asbestos gasket material which comprises 25–75% by weight of at least two types of fibers selected from at least one of two groups of inorganic fibers other than asbestos and a group of organic fibers, 5–50% by weight of rubber selected from the group consisting of natural rubber and synthetic rubber, the remainder being fillers and rubber chemicals, and which is prepared by uniformly mixing said fibers, said fillers and said rubber chemicals together with a solution of said rubber in an organic solvent, pre-forming the resulting mixture into a pre-sheet having a given thickness with the use of rolls, and hot-pressing the thus obtained pre-sheet under a reduced pressure and, then, under an elevated pressure.

* * * * *